United States Patent [19]

Johnson et al.

[11] Patent Number: 5,520,708
[45] Date of Patent: May 28, 1996

[54] SOYBEAN OIL ESTER FUEL BLENDS

[75] Inventors: Lawrence A. Johnson; Earl G. Hammond, both of Ames, Iowa

[73] Assignee: Iowa State University Research Foundation, Inc., Ames, Iowa

[21] Appl. No.: 233,123

[22] Filed: Apr. 26, 1994

[51] Int. Cl.$^6$ .................................................. C10L 1/18
[52] U.S. Cl. ............................................................ 44/388
[58] Field of Search ............................. 44/386, 388, 389, 44/308

[56] References Cited

U.S. PATENT DOCUMENTS

| | | |
|---|---|---|
| 3,282,662 | 11/1966 | Henderson . |
| 3,288,577 | 11/1966 | Patinkin et al. . |
| 4,364,743 | 12/1982 | Erner .......................................... 44/388 |
| 4,695,411 | 9/1987 | Stern et al. . |
| 5,092,908 | 3/1992 | Feldman et al. . |
| 5,094,666 | 3/1992 | Feldman et al. . |
| 5,160,506 | 11/1992 | Schur et al. . |

OTHER PUBLICATIONS

Lee et al., "Reducing Crystallization of Soybean Oil Ester Diesel Fuel Blends at Cold Operating Temperatures," *Inform*, 5, 529 (Apr. 1994).

*Primary Examiner*—Prince Willis, Jr.
*Assistant Examiner*—Cephia D. Toomer
*Attorney, Agent, or Firm*—Schwegman, Lundberg, Woessner & Kluth

[57] ABSTRACT

A method is provided to reduce the crystallization temperature of a fatty acid oil ester-petroleum distillate fuel blend. The method comprises combining a petroleum distillate with an amount of an ester of a branched chain ($C_3$–$C_5$) alcohol of a fatty acid, wherein the amount utilized is effective to lower the crystallization onset point of the blend by about 8°–20° C. Blowy that of a blend comprising the same amount of a methyl or ethyl ester.

12 Claims, No Drawings

SOYBEAN OIL ESTER FUEL BLENDS

BACKGROUND OF THE INVENTION

The term "liquid synthetic fuels" has come to refer to prepared liquids having characteristics approaching those of the petroleum-based fuels in current commerce, specifically gasolines, kerosenes, jet fuels, and fuel oils. Synthetic fuels may be prepared by processes comprising liquefaction of coals, destructive distillation of kerosene or coal, and extraction or hydrogenation of organic matter in coke liquids, coal tars, tar sands, or bitumen deposits, in addition to processes that fit the classical definitions of synthetic processes.

Carbonaceous fuel substances, other than natural petroleum, are widely distributed throughout the world. In the Western hemisphere, Canada has large tar sand, bitumen (or very heavy crude oil), and coal deposits. The United States has very large reserves of coal and shale. The total resource base is immense by any estimate. Unfortunately, estimates of the quantities of in-place reserves that may be recoverable with current technology range no higher than about 10%. Hence, considerable pressure for new recovery technology will develop along with pressure for advances that reduce the level of fuel usage.

Most carbonaceous substances may be combusted more or less directly in suitable equipment to produce heat or power. Direct combustion may represent the means for deriving maximum benefit of the heating or energy value of particular fuel substances, although the necessity to limit emissions of noxious compounds, especially of sulfur or nitrogen, and to control disposition of noncombustible residues, may significantly reduce the overall thermal efficiency of the combustion process and add to the cost of work so produced. The principal concern regarding the air pollutants emitted from the combustion of fossil fuels, for instance, is the long-term chronic health effects that appear to be related to large concentrations of air pollutants. In addition, the sulfur or nitrogen oxides (or both) are believed to be the cause of acid rain.

Due to these concerns, the Environmental Protection Agency is currently enforcing very strict emission regulations for truck and diesel engines. Similarly, strict emissions standards will go into effect for agricultural and other off-road vehicle engines starting in 1996. These standards are applied with particular scrutiny to particulate emissions. Particulate emissions are especially troublesome in that they represent a more significant and present threat to the environment; one which is readily observable through effects such as smog. Researchers are attempting to maintain fuel efficiency while reducing the percentage of particulate emissions. Recently, advances have been made which strike a more desirable balance through the use of blends of petroleum based fuel with alkyl esters of the fatty acids contained in vegetable oils or animal fats, known as "biodiesel". Alkyl esters, such as methyl esters, of fatty acids are generally preferred in biodiesel over the use of the vegetable oils and animal fats themselves because the alkyl esters have a viscosity that is more appropriate to diesel fuel. Through the use of these fuel blends, researchers have attained reductions in particulate emissions from diesel engines.

Although advantageous in reducing particulate emissions, the use of biodiesel is not without drawbacks. In particular, saturated long-chain fatty acid esters that result from the esterification of the fatty acids contained in animal fats and vegetable oils with methanol or ethanol tend to raise the freezing points of the fuel blends, which causes the fuels to precipitate or gel at cold temperatures. Keeping such blends liquid and suitable for engine use requires special equipment and handling. These problems greatly reduce the practicality of using fatty ester-petroleum distillate blends in cold weather.

For example, methyl or ethyl esters of soybean oil fatty acids have cloud points (the lowest temperature at which a fluid can be held without beginning to crystallize and turn cloudy) of about 1°–5° C. and pour points (the lowest temperature at which a fluid can be held without crystallizing to the extent that it lacks sufficient fluidity to be poured) of about −4° C. Furthermore, when mixed with diesel fuel, slightly lower temperatures can be tolerated (i.e., −12° C. when using methyl esters of soybean oil fatty acids, as compared with −21° C. for winter grade diesel fuel).

In U.S. Pat. No. 4,364,743 (Erner et al.), various synthetic vegetable oil esters are disclosed as possible fuel additives. This patent discloses that the combustion properties of the blends are satisfactory. However, it does not disclose that such esters can alleviate the tendency of the fuel blends to precipitate or gel at cold temperatures, while retaining suitable combustion properties.

Therefore, there is a need for a method to produce vegetable oil ester-petroleum distillate fuel blends that exhibit reduced crystallization temperatures, thereby enabling wintertime usage.

SUMMARY OF THE INVENTION

The present invention provides a method to reduce the crystallization temperature of a liquid fuel blend by combining petroleum distillates with branched chain esters synthesized from triglyceride-containing fats and oils, such as animal and/or vegetable fats and oils. A preferred embodiment of the present invention comprises combining petroleum distillates such as diesel fuel and other middle petroleum distillates with esters of branched chain alcohols such as isopropyl esters, 2-butyl esters, and/or tertiary butyl esters synthesized from fats and oils containing fatty acid triglycerides, such as soybean oil. The branched esters are present in an amount effective to lower the crystallization onset point of the fuel blend by about 8°–20° C. below that of a blend comprising the same amount of a methyl ester wherein the onset of crystallization of the blend is less than about −20° C. Preferably, the esters used are present in an amount of up to about 50% of the total blend and may be present in an amount of up to about 99% of the total blend, and are esters of soybean oil. These amounts are sufficient to reduce the crystallization onset point of the blend to equal to or less than about −13° C. More preferably, the esters used are esters of low palmitic soybean oil and are present in amounts sufficient to reduce the crystallization onset point of the blend equal to or less than about −19° C. to about 20° C.

The petroleum distillates can have a molecular weight of from about 140 to about 300, and in a preferred embodiment, the petroleum distillate is kerosene. However, use of the petroleum distillates (bp 140°–340° C.) as defined by Erner (U.S. Pat. No. 4,364,743) is also within the scope of the invention. The term "liquid" as used herein is defined as liquid at room temperature (20°–30° C.). As used herein, the term "amount" or "percent" refers to weight-percent.

DETAILED DESCRIPTION OF THE INVENTION

Oils are classified according to their principal fatty acids, eg., lauric (coconut, palm kernel oils), palmitic (palm oil), oleic (olive, groundnut, rapeseed, sesame oils), linoleic (soybean, cottonseed, corn oils, sunflower, safflower oils), linolenic (linseed oil), and ricinoleic (castor oil). Unsaturation occurs primarily, but not exclusively, in acids with an 18-carbon chain. Reduction in unsaturation raises the melting range and enhances resistance to oxidation. Low saturate soybean oils can also be used.

Hydrogenation, interesterification, and fractional crystallization can modify the relationship between solids content and the temperature of oils and their blends to give products of specific functional properties. Hydrogenation reduces the degree of unsaturation, interesterification rearranges the fatty acid combinations that occur in the triglyceride mixtures and fractional crystallization modifies the melting properties without resorting to chemical change.

The esters useful in the present invention are commercially available or may be prepared by known methods such as transesterification of the native oils or esterification of the free fatty acids derived from such oils.

Preferably, the esters are prepared by a type of transesterification known as alcoholysis in which the acyl groups in the triglycerides such as soybean oil, safflower oil, corn oil, lard, tallow, etc., are allowed to exchange with an excess of some added alcohol, such as methanol, so that nearly all the acyl groups are recovered as methyl esters rather than as glycerol esters. The transesterification is accomplished by means of a transesterification catalyst such as sodium alkoxide, sodium or potassium hydroxide, and the like. Acid catalysts, such as sulfuric acid, hydrogen chloride and boron trifluoride can also be used. The acid catalysts are particularly appropriate when large amounts of free fatty acids are present in the oil. The amount of catalyst is generally in the range of from about 0.1 to about 0.5% by weight, based on the weight of the oil. The temperatures and pressures used will depend on the alcohol used in the reaction. The resulting ester may be freed of glycerol by water washing and the excess alcohol can be removed by water washing and/or distillation.

The esters of the present invention may be used alone as a fuel or preferably, in combination with petroleum middle distillates to form a mixture therewith. The term "petroleum middle distillates" as used herein includes all middle distillates having a boiling point in the range of from about 140° C. to about 330° to about 340° C. and being derived from sources such as crude oil, coal, oil shale, and the like, which may be used in oil-burning devices.

Middle distillates are obtained from crude oil by fractional distillation of the oil. These middle distillate products contain various hydrocarbons such as paraffins, olefins, naphthalenes, aromatics and minor amounts of cycloolefins, diolefins and multiunsaturated acyclic and cyclic compounds. Products obtained from coal hydrogenation would also provide suitable middle distillates, as would the distillation products obtained from the retorting of oil shale. Accordingly, the term "petroleum middle distillate" as employed herein is intended to include those middle distillates which can be obtained from crude oil, coal hydrogenation, oil shale and the like.

The following examples are illustrative of the best mode for carrying out the invention. They are obviously not to be construed as limitative of the invention since various other embodiments can readily be evolved in view of the teaching provided herein.

Preparation of Esters of Soybean Oil

Esters of soybean oil (SBO) were prepared by transesterification between refined SBO and various anhydrous alcohols (molar ratio of oil:alcohol −1:66) using 1% (by weight) of sodium alkoxides of the pertinent alcohols as catalysts. The catalysts were prepared as 1M solutions by reacting sodium metal with the alcohols. The reactants and catalyst were stirred vigorously at room temperature or 32° C. Refluxing was needed for tert-butyl and neo-pentyl esterification. Reaction time depended on the ratio of SBO to alcohol and the temperature. The reaction mixture was extracted with hexane, washed with water, and the esters were obtained as the residue after evaporation of the solvent under vacuum. For differential thermal analysis (DTA), the esters were purified further by thin-layer chromatography (TLC) as will be described later. Impurities were mostly monoglycerides and soaps. TLC was also used to monitor the esterification reaction.

EXAMPLE 1

Preparation of Isopropyl esters of soybean oil

Refined SBO (300 g) was mixed into 1632 g isopropanol (IPA) in a 4 L flask, and 51 mL of 1M sodium iso-propoxide was added. The reaction mixture was stirred vigorously at 32° C. Esterification was monitored by TLC. After 6 hours, 300 g hexane and 300 ml water were added to the reaction mixture to induce a phase separation. The lower phase, which is a mixture of water, IPA, glycerol and other impurities, was discarded. The upper phase, an ester-rich layer, was washed with additional water and isolated until it became clear. The solvent was evaporated from the cleared upper layer, and 273.5 g of isopropyl esters of soybean oil (IPSBO) were obtained as the residue. No tri- and diglycerides were detected from the IPSBO on TLC plates.

EXAMPLE 2

Purification of Esters

Esters were prepared by the reaction of several fats and oils with several kinds of alcohols. These esters were then purified as follows. About 0.3 g of esters were diluted with the same amount of hexane and applied to a TLC plate (silica gel Type G, 1.0 mm thick). The plate was developed in hexane/ether/acetic acid (90/10/1, v/v/v), and the bands were visualized by spraying with 0.2% 2', 7'-dichlorofluorescein in ethanol and viewed under ultraviolet light. Esters were eluted from the plates with hexane, and the solvent evaporated under vacuum.

EXAMPLE 3

Determination of Crystallizing Properties of Esters

Crystallizing properties of pure esters were measured by cloud points, pour points and crystallization onsets from DSC and DTA. ASTM (American Society for Testing and Materials) methods were followed for the tests of cloud point (D 2500-88) and pour point (D 97- 87).

A Perkin Elmer DSC7 equipped with Intracooler System II was used to obtain cooling and heating thermograms of the esters. Approximately 7.5 mg of samples were accurately weighed into aluminum pans. An empty pan was used as a reference. The samples were melted at 100° C. for 2 minutes to remove all crystal nuclei and cooled to −70° C. at the rate of 200° C./min until the heat flow stabilized. The samples were then reheated to 60° C. with the scanning rate of 5° C./min. Crystallization onset was determined as the temperature where the highest melting peak of the thermogram returned to the baseline, that is, the lowest temperature where all the sample remained liquid. The results from this study are shown in Table 1.

TABLE 1

Onset of crystallization of diesel fuel and various pure esters of natural fats and oils. The results are the average of two preparations.
Onset of Crystallization (°C.)[a]

| Substance | Diesel Fuel | Soybean Oil | Low Palmitic Soybean Oil[b] | Canola | Lard |
|---|---|---|---|---|---|
| Petroleum[c] | −11.9 | — | — | — | — |
| Methyl esters | — | 5.2 | −1.0 | — | — |
| Ethyl esters | — | 1.4 | −3.8 | 0.4 | 12.1 |
| Isopropyl esters | — | −6.0 | −12.0 | −6.8 | 4.0 |
| 2-Butyl esters | — | −9.0 | −18.5 | −8.1 | 0.5 |
| Tert-butyl esters | — | −8.0 | — | — | — |
| 2,2-Dimethyl-1-propyl esters | — | 1.2 | — | — | — |

[a]Cloud points are conventionally used in examining the onset of crystallization fuels and oils. It is expected that cloud point data will parallel the differential thermal analysis of Table 1.
[b]Contains 4% palmitate compared with 10% in a typical soybean oil.
[c]Number 2 diesel fuel.

These results reveal that the temperatures of crystallization onset of branched-chain isopropyl and 2-butyl soybean oil esters are lower than the onset of crystallization of unbranched soybean oil esters by 7.4° C. and 10.4° C., respectively, compared with ethyl esters and 11.2° C. and 14.2° C., respectively, compared with methyl esters. Specifically, 2-butyl ester has an onset of crystallization of about −9° C. to −20° C. The esters of canola oil performed comparably to soybean oil esters. The more saturated lard has much higher crystallization onset than vegetable oils regardless of the ester used. The use of special soybean oil varieties with low palmitate content can reduce the onset of crystallization of the branched chain esters a further 5°–9° C. more than ordinary soybean oil branched chain esters, depending on the alcohol used.

Since petroleum-based diesel fuel begins to crystallize at about −12° C., this data demonstrates that the use of branched-chain esters of ordinary soybean oil crystallize at temperatures almost as low as petroleum-based diesel fuel, and if low-palmitate soybean oil is used, crystallization onset can match or be lower than that of petroleum-based diesel fuel.

EXAMPLE 4

Preparation of Ester/Diesel Fuel Blends

This evaluation was conducted using a lighter petroleum distillate, kerosene, rather than with #1 diesel fuel, to focus on the crystallization onset temperature of the esters rather than the crystallization onset of the fuel itself. Any crystallization of the fuel would confound with the crystallization of the esters being measured, especially in the case of summer formulations (#2 diesel fuel) which have especially high crystallization temperatures (i.e. −12° C.). The crystallization properties of these ester/fuel blends were then measured by cloud points, pour points and crystallization onsets from DSC and DTA as described in Example 3.

Briefly, a Perkin Elmer DSC7 equipped with Intracooler System II was used to obtain cooling and heating thermograms of the blends. Approximately 7.5 mg of samples were accurately weighed into aluminum pans. An empty pan was used as a reference. The samples were melted at 100° C. for 2 minutes to remove all crystal nuclei, and cooled to −70° C. at the rate of 200° C./min until the heat flow stabilized. The samples were then reheated to 60° C. with the scanning rate of 5° C./min. Crystallization onset was determined as the temperature where the highest melting peak of the thermogram returned to the baseline, that is, the lowest temperature where all the sample remained liquid. The results of these studies as carried out on various kerosene/soybean ester blends are shown in Table 2.

TABLE 2

Onset of Crystallization (°C.) for Various Blends of Soybean Oil Esters and Kerosene by Differential Scanning Calorimetry
% Esters

| ESTERS | 30% | 50% | 100% |
|---|---|---|---|
| Methyl | −14.7 | −5.7 | 5.0 |
| Isopropyl | −29.1 | −19.4 | −7.0 |
| 2-Butyl | −30.2 | −23.1 | −10.3 |

EXAMPLE 5

Preparation of Esters of Soybean Oil with Removal of Glycerol and other Impurities Preparation of soybean oil esters using various ratios of alcohol to soybean oil at reflux temperature for various times using the sodium alkoxide catalyst corresponding to the alcohol being used will be studied. Also, testing of the relative advantage of partial removal of the glycerol by using an acid catalyst and water followed by drying and a final esterification with alkali according to Stern et al. (U.S. Pat. No. 4,695,411) will be pursued. Additionally, studies will be conducted regarding the best way to remove traces of free fatty acids, partial glycerides and other possible impurities by such techniques as extraction with alkali, acetylation with acetic anhydride, adsorption, winterization, and molecular distillation. The extent of conversion of the soybean oil to methyl, isopropyl, and 2-butyl esters in these experiments will be analyzed by high-performance liquid chromatography.

EXAMPLE 6

Engine Performance and Combustion Emissions

A diesel engine will be operated on pure esters and blends of esters and petroleum-based diesel fuel in appropriate ratios. The following soybean oil esters will be examined: methyl esters (as a control), optimally winterized methyl esters, isopropyl esters and 2-butyl esters.

Engine performance will be measured by standard procedures. A John Deere 4276T four cylinder engine with a Kistler pressure transducer will be utilized for these studies and will be operated at several different speeds and loads corresponding to one of the currently used mode tests. The length of time the engine will be operated at each steady state condition and which mode test will be used will depend on the amount of the various fuels that will be available. Combustion and emission characteristics to be measured include engine cylinder pressure, carbon monoxide, nitric oxide, unburned hydrocarbon, and exhaust particulates. The engine is equipped with a high speed data acquisition system to also measure and store cylinder pressure data. From the collected data, it will be possible to determine whether the different fuels have any positive or negative effects on emission. It may be possible to optimize the formulation of the soy oil esters to minimize the diesel exhaust emissions.

The primary objective of the engine testing will be to make direct comparisons between fuels and blends. The testing will allow screening of those fuels that offer the pretest promise of emission reduction without adverse effects on combustion. It is expected that a follow-up test program involving these fuels will be desirable, using an engine typical of urban buses in an EPA-recognized laboratory.

The cited patents are incorporated by reference herein. While only certain preferred embodiments of this invention have been shown and described by way of illustration, many modifications will occur to those skilled in the art and it is, therefore, desired that it be understood that this is intended herein to cover all such modifications that fall within the spirit and scope of this invention.

What is claimed is:

1. A method of reducing the crystallization temperature of a liquid fatty acid ester-petroleum distillate fuel blend comprising combining a petroleum distillate with an amount of a fatty acid ester of an animal or vegetable fat or oil selected from the group consisting of an isopropyl ester, a 2-butyl ester, a tert-butyl ester and mixtures thereof, wherein said amount is effective to lower the crystallization onset point of the blend by about 8°–20° C. below that of a blend comprising the same amount of a methyl ester.

2. The method of claim 1 wherein said ester is present in the blend in an amount of up to about 50 weight percent.

3. The method of claim 1 wherein the oil is soybean oil so that the crystallization onset is about −20° C. or less.

4. The method of claim 3 wherein the ester is an isopropyl ester having an onset of crystallization of about −6° C. to −12° C.

5. The method of claim 3 wherein the ester is a 2-butyl ester having an onset of crystallization of about −9° C. to −20° C.

6. The method of claim 3 wherein the ester is a tertiary butyl ester having an onset of crystallization of about −8° C.

7. The method of claim 3 wherein the soybean oil is a low-palmitic soybean oil, and wherein the ester is a isopropyl ester having an onset of crystallization of about −12° C.

8. The method of claim 3 wherein the soybean oil is a low-palmitic soybean oil, and wherein the ester is a 2-butyl ester having an onset of crystallization of about −19° C.

9. The method of claim 1 wherein the petroleum distillate has a boiling point in the range of from about 140° C. to about 340° C.

10. The method of claim 1 wherein the petroleum distillates have a molecular weight of about 140–300.

11. The method of claim 1 wherein the petroleum distillate is kerosene.

12. The method of claim 1 wherein the onset of crystallization of the blend is less than about −20° C.

* * * * *

UNITED STATES PATENT AND TRADEMARK OFFICE
CERTIFICATE OF CORRECTION

PATENT NO. : 5,520,708

DATED : May 28, 1996

INVENTOR(S) : Johnson et al.

It is certified that error appears in the above-identified patent and that said Letters Patent is hereby corrected as shown below:

On the title page:
   Item [57]: ABSTRACT, line 7 please delete "C. Blowy" and insert -- C below --

In column 2, line 57 after "140°", please delete "-" and insert --to about--

In column 3, line 43 please delete " C. to about 330° to about 340°C." and insert --C to about 340°C--

Signed and Sealed this

Twelfth Day of August, 1997

*Attest:*

BRUCE LEHMAN

*Attesting Officer*    *Commissioner of Patents and Trademarks*